(12) United States Patent
Hida et al.

(10) Patent No.: US 10,611,321 B2
(45) Date of Patent: Apr. 7, 2020

(54) WIRING MODULE (71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi (JP)

(72) Inventors: Yoshihiro Hida, Mie (JP); Shinya Itou, Mie (JP); Yuuya Fukami, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industres, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 16/343,821

(22) PCT Filed: Oct. 12, 2017

(86) PCT No.: PCT/JP2017/036907
§ 371 (c)(1),
(2) Date: Apr. 22, 2019

(87) PCT Pub. No.: WO2018/079270
PCT Pub. Date: May 3, 2018

(65) Prior Publication Data
US 2019/0248309 A1 Aug. 15, 2019

(30) Foreign Application Priority Data
Oct. 26, 2016 (JP) .................. 2016-209401

(51) Int. Cl.
*H02G 3/22* (2006.01)
*B60R 16/02* (2006.01)
*B60R 16/03* (2006.01)

(52) U.S. Cl.
CPC .......... *B60R 16/0215* (2013.01); *B60R 16/03* (2013.01); *H02G 3/22* (2013.01)

(58) Field of Classification Search
CPC combination set(s) only.
See application file for complete search history.

(56) References Cited

U.S. PATENT DOCUMENTS 2,957,157 A * 10/1960 Carter .................. H01R 33/02
439/226
3,663,867 A * 5/1972 Fister .................... B60R 25/04
361/171
(Continued)

FOREIGN PATENT DOCUMENTS

JP H7-031036 A 1/1995
JP 2012-016085 A 1/2012

OTHER PUBLICATIONS

International Search Report, Application No. PCT/JP2017/036907, dated Nov. 7, 2017. ISA/Japan Patent Office.

*Primary Examiner* — William H. Mayo, III
*Assistant Examiner* — Krystal Robinson
(74) *Attorney, Agent, or Firm* — Honigman LLP (57) ABSTRACT

Provided is a wiring module for which the shape of a through hole formed in a wall of a vehicle can be set independent of the cross section of a conductor plate. The wiring module penetrates a wall provided in a vehicle. The wiring module includes a pair of conductor plates and a conductive fastening member. The pair of conductor plates are disposed opposite to each other via the wall. The fastening member penetrates the wall to be conductively connected to the pair of conductor plates, and fastens the pair of conductor plates to the wall.

5 Claims, 7 Drawing Sheets (56) References Cited

U.S. PATENT DOCUMENTS

| | | | | |
|---|---|---|---|---|
| 3,902,157 | A * | 8/1975 | Kita | F16D 66/022 |
| | | | | 340/454 |
| 5,023,752 | A * | 6/1991 | Detter | B60R 16/0238 |
| | | | | 361/646 |
| 5,288,141 | A * | 2/1994 | Isshiki | B60T 8/344 |
| | | | | 303/119.1 |
| 5,486,434 | A * | 1/1996 | Aoyama | H01R 11/283 |
| | | | | 429/121 |
| 5,508,877 | A * | 4/1996 | Smith | H01T 4/06 |
| | | | | 361/119 |
| 5,828,008 | A * | 10/1998 | Lockwood | H01R 4/26 |
| | | | | 174/138 R |
| 6,033,269 | A * | 3/2000 | Sekido | B60R 16/0239 |
| | | | | 439/796 |
| 6,361,375 | B1 * | 3/2002 | Sinclair | H01R 25/006 |
| | | | | 439/721 |
| 10,338,518 | B2 * | 7/2019 | Cavill | G03G 15/086 |
| 2014/0219739 | A1 * | 8/2014 | Hirayama | F16B 41/002 |
| | | | | 411/103 |
| 2015/0064989 | A1 * | 3/2015 | Hirasawa | H01R 4/305 |
| | | | | 439/781 |
| 2017/0355327 | A1 | 12/2017 | Hida et al. | |

* cited by examiner

WIRING MODULE

CROSS-REFERENCE TO RELATED APPLICATIONS

This application is the U.S. national stage of PCT/JP2017/036907 filed Oct. 12, 2017, which claims priority of Japanese Patent Application No. JP 2016-209401 filed Oct. 26, 2016, the contents of which are incorporated herein.

TECHNICAL FIELD

The present disclosure relates to a wiring module.

BACKGROUND

JP 2016-120901A describes an automobile power supply device. The automobile power supply device is provided with a battery and two pieces of metal wiring. The battery is installed within an engine room of a vehicle body. The two pieces of metal wiring have a plate shape, and are respectively connected to the positive-side terminal and the negative-side terminal of the battery.

In addition, the vehicle body is provided with a plurality of electric devices. The plurality of electric devices are connected at positions nearby to the pieces of metal wiring via a wire harness. This allows power to be supplied from the battery to the electric devices.

In a vehicle, a wall for partitioning space is provided, and metal wiring (hereinafter also referred to as a "conductor plate") may be disposed penetrating the wall. In this case, a through hole corresponding to the cross section of the conductor plate is formed in the wall. That is, the shape of the through hole formed in the wall is dependent on the cross section of the conductor plate, and the design degree of freedom thereof is limited.

Therefore, an object of the present disclosure is to provide a wiring module for which the shape of the through hole formed in the wall of the vehicle can be set independent of the cross section of the conductor plate.

SUMMARY

A wiring module according to a first aspect is a wiring module configured to penetrate a wall provided in a vehicle, including a pair of first conductor plates and a conductive first fastening member. The pair of first conductor plates are disposed opposite to each other via the wall. The first fastening member is configured to penetrate the wall while being conductively connected to the pair of first conductor plates, and to fasten the pair of first conductor plates to the wall.

A wiring module according to a second aspect is the wiring module according to the first aspect, wherein one of the pair of first conductor plates includes a first body plate and a second mounting plate. The first body plate extends in a direction away from the wall. The first mounting plate extends along the wall from an end of the first body plate that is located on the wall side. The first fastening member fastens the first mounting plate to the wall.

A wiring module according to a third aspect is the wiring module according to the second aspect, further including a pair of second conductor plates and a conductive second fastening member. The pair of second conductor plates are disposed opposite to each other via the wall. The second fastening member is configured to penetrate the wall while being conductively connected to the pair of second conductor plates, and to fasten the pair of second conductor plates to the wall. One of the pair of second conductor plates includes a second body plate and a second mounting plate. The second body plate extends spaced apart from, and overlapping with, the first body plate in a thickness direction of the first body plate. The second mounting plate is spaced apart from the first mounting plate, and extends on the same side as the first mounting plate from an end of the second body plate that is located on the wall side. The first mounting plate includes a first fastening target portion that does not overlap with the second mounting plate. The second mounting plate includes a second fastening target portion that does not overlap with the first mounting plate. The first fastening member fastens the first fastening target portion to the wall. The second fastening member fastens the second fastening target portion to the wall.

A wiring module according to the fourth aspect is the wiring module according to the third aspect, wherein the second mounting plate includes a first portion and a second portion. The first portion is spaced apart from the first mounting plate, and overlaps with the first mounting plate in a direction perpendicular to the wall. The second portion is folded back from the first portion so as to be located on the wall side relative to the first portion. A distal end portion of the second portion extends outward from a side portion of the first portion, and the second fastening target portion is the distal end portion.

A wiring module according to a fifth aspect is the wiring module according to the third or fourth aspect, wherein the first mounting plate further includes an overlapping portion and a coupling portion. The overlapping portion is located opposite to the wall relative to the second mounting plate, and overlaps with the second mounting plate in a direction perpendicular to the wall. The coupling portion couples the overlapping portion and the first fastening target portion to each other. The coupling portion extends approaching the wall toward the first fastening target portion, and the first fastening target portion is located closer to the wall than the overlapping portion is.

Advantageous Effects of Disclosure

With the wiring module, it is possible to set the shape of a through hole formed in a wall of a vehicle, independent of the cross section of a pair of first conductor plates.

DETAILED DESCRIPTION OF PREFERRED EMBODIMENTS

Figure 1:
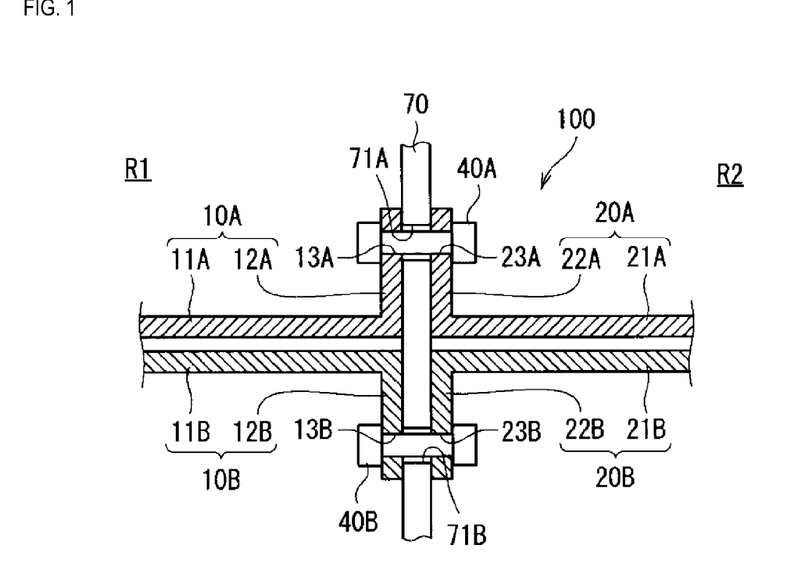
FIG. 1 is a cross-sectional view schematically showing an exemplary configuration of a wiring module.

FIG. 1 is a diagram schematically showing an exemplary configuration of a wiring module 100. The wiring module 100 is mounted in a vehicle (e.g., an automobile). In addition, the vehicle is provided with a wall 70. The wall 70 is a wall that partitions a first space R1 and a second space R2 in the vehicle. For example, the first space R1 is a space (e.g., an engine room) in which a traveling power supply (e.g., an engine) is disposed, and the second space R2 is a space (so-called "vehicle compartment") in which a passenger sits. The wall 70 may form a portion of a dashboard, for example. The wall 70 is made of, for example, an insulating material (e.g., a resin). The wiring module 100 extends from the first space R1 through the wall 70 to the second space R2.

The wiring module 100 includes a pair of conductor plates 10A and 20A, a pair of conductor plates 10B and 20B, and fastening members 40A and 40B. In the following, the pair of conductor plates 10A and 20A and the fastening member 40A will be described first, and then the pair of conductor plates 10B and 20B and the fastening member 40B will be described.

Figure 2:
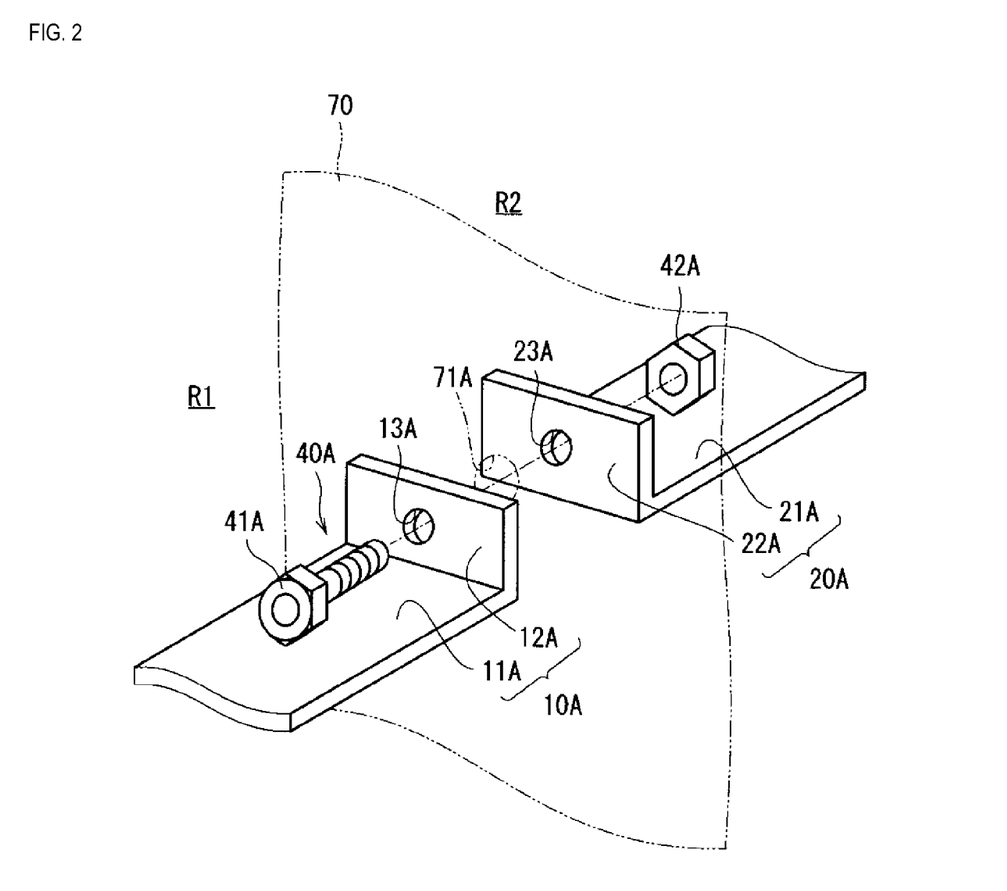
FIG. 2 is an exploded perspective view schematically showing an exemplary configuration of the wiring module.

FIG. 2 is an exploded perspective view schematically showing an exemplary configuration of the pair of conductor plates 10A and 20A and the fastening member 40A. In FIG. 2, the wall 70 is schematically shown as a plane. The conductor plates 10A and 20A are disposed opposite to each other relative to the wall 70. For example, the conductor plate 10A is disposed in the first space R1, and the conductor plate 20A is disposed in the second space R2. The conductor plates 10A and 20A are electrically conductive, plate-shaped members. For example, the conductor plates 10A and 20A are made of a metal such as copper, a copper alloy, aluminum, or an aluminum alloy. As will be described below, the conductor plates 10A and 20A can function as wiring.

For example, the conductor plate 10A includes a body plate 11A and a mounting plate 12A. The body plate 11A extends in a direction away from the wall 70. Therefore, the longitudinal direction of the body plate 11A intersects the wall 70. For example, the longitudinal direction of the body plate 11A is substantially orthogonal to the wall 70. The body plate 11A has a flat shape (e.g., a rectangular shape) on a cross section perpendicular to the longitudinal direction thereof. The thickness of the body plate 11A may be set as appropriate, but may be set to 0.5 [mm] or more and 1 [mm] or less, for example. The width (width along a direction perpendicular to both the longitudinal direction and the thickness direction) of the body plate 11A may also be set as appropriate, but may be set to 50 [mm] or more and 100 [mm] or less, for example.

The mounting plate 12A extends along the wall 70 from an end of the body plate 11A that is located on the wall 70 side. In the example shown in FIG. 1, the mounting plate 12A extends upward in the plane of paper from the aforementioned end of the body plate 11A. The mounting plate 12A may have a flat shape (e.g., a rectangular shape) on a cross section perpendicular to the extension direction thereof. The thickness (thickness along a direction perpendicular to the wall 70) of the mounting plate 12A may be set as appropriate, but may be set to be comparable to the thickness of the body plate 11A, for example. The width (width along a direction perpendicular to both the above-described extension direction and the thickness direction) of the mounting plate 12A may also be set as appropriate, but may be set to be comparable to the width of the body plate 11A, for example.

A through hole 13A is formed in the mounting plate 12A. The through hole 13A extends through the mounting plate 12A along a direction perpendicular to the wall 70. In the following, the direction perpendicular to the wall 70 may also be called a "through direction". The through hole 13A has, for example, a circular shape as viewed along the through direction. The diameter of the through hole 13A may be set as appropriate, but can be set to a value with which a fastening member 40A, which will be described below, can penetrate the through hole 13A and fasten the conductor plates 10A and 20A to the wall 70.

For example, the conductor plate 20A includes a body plate 21A and a mounting plate 22A. The mounting plates 12A and 22A face each other via the wall 70. The shape and the size of the body plate 21A are the same as those of the body plate 11A, and the shape and the size of the mounting plate 22A are the same as those of the mounting plate 12A. Therefore, redundant descriptions thereof are omitted.

A through hole 23A is formed in the mounting plate 22A. The through hole 23A extends through the mounting plate 22A along the through direction. The through holes 13A and 23A are formed at positions at which they face each other in the through direction. The shape and the size of the through hole 23A as viewed along the through direction are the same as those of the through hole 23B, and, therefore, redundant descriptions thereof are omitted.

A through hole 71A is formed in the wall 70. The through hole 71A extends through the wall 70 along the through direction. In addition, the through hole 71A is formed at a position in which it faces the through holes 13A and 23A in the through direction. That is, the through holes 13A, 71A, and 23A are disposed in that order from the first space R1 side toward the second space R2 side. The through hole 71A has, for example, a circular shape as viewed along the through direction. The diameter of the through hole 71A can be set to a value such that the fastening member 40A can penetrate the through hole 71A and that the wall 70 is interposed between the mounting plates 12A and 22A.

The fastening member 40A is electrically conductive, penetrates the wall 70 while being conductively connected to the conductor plates 10A and 20A, and fastens the conductor plates 10A and 20A to the wall 70. The material of the fastening member 40A may be selected as appropriate, and a metal (e.g., iron) can be used, for example. Since the conductor plates 10A and 20A are electrically connected to each other via the fastening member 40A, a set of the conductor plates 10A and 20A and the fastening member 40A can function as wiring.

Referring also to FIG. 2, the fastening member 40A includes a bolt 41A and a nut 42A, for example. The bolt 41A penetrates the through holes 13A, 71A, and 23A, and threadably engages with the nut 42A at its distal end. For example, the bolt 41A is in contact with the mounting plate 12A at the head portion thereof, and the nut 42A is in contact with the mounting plate 22A. With this configuration, the fastening member 40A is electrically connected to each of the conductor plates 10A and 20A. Note that a conductive member such as a washer may be interposed between the bolt 41A and the mounting plate 12A. Similarly, a conductive member may be interposed between the nut 42A and the mounting plate 22A. The reason is that, with this configuration as well, the conductor plates 10A and 20A are electrically connected to each other via the fastening member 40 and the conductive member.

The diameter of a columnar portion of the bolt 41A that penetrates the through holes 13A, 71A, and 23A may be set as appropriate, but may be set to 6 [mm] or more and 9 [mm] or less.

Next, the pair of conductor plates 10B and 20B and the fastening member 40B will be described. The conductor plates 10B and 20B are electrically conductive, and the material thereof is the same as that of the conductor plates 10A and 20A. Referring to FIG. 1, the conductor plate 10B is disposed spaced apart from the conductor plate 10A on the same side as the conductor plate 10A relative to the wall 70, i.e., in the first space R1. Accordingly, the conductor plates 10A and 10B are insulated from each other in the first space R1. A predetermined insulator (e.g., a resin) may be provided between the conductor plates 10A and 10B.

The conductor plate 20B is disposed spaced apart from the conductor plate 20A on the same side as the conductor plate 20A relative to the wall 70, i.e., in the second space R2. Accordingly, the conductor plates 20A and 20B are insulated from each other in the second space R2. A predetermined insulator (e.g., a resin) may be provided between the conductor plates 20A and 20B.

For example, the conductor plate 10B includes a body plate 11B and a mounting plate 12B. The body plate 11B is spaced apart from, and overlaps with, the body plate 11A in the thickness directions of the body plates 11A and 11B. That is, the body plates 11A and 11B face each other in an orientation in which the thickness directions of the body plates 11A and 11B substantially coincide with each other. The body plate 11B extends along the longitudinal direction of the body plate 11A. That is, the longitudinal direction of the body plate 11B also intersects the wall 70. The shape and the size of the body plate 11B are the same as those of the body plate 11A, and, therefore, redundant descriptions thereof are omitted.

The mounting plate 12B extends along the wall 70 from an end of the body plate 11B that is located on the wall 70 side. In the example shown in FIG. 1, the mounting plate 12B extends along the wall 70 from the aforementioned end of the body plate 11B toward the side opposite to the conductor plate 10A. That is, the mounting plates 12A and 12B extend in directions opposite to each other from the ends of the body plates 11A and 11B, respectively. The shape and the size of the mounting plate 12B are the same as those of the mounting plate 12A, and, therefore, redundant descriptions thereof are omitted.

A through hole 13B is formed in the mounting plate 12B. The through hole 13B extends through the mounting plate 12B along the through direction. The through hole 13B has, for example, a circular shape as viewed along the through direction. The diameter of the through hole 13B may be set as appropriate, but may be set to a value such that a fastening member 40B, which will be described below, can penetrate the through hole 13B and fasten the conductor plates 10B and 20B to the wall 70.

For example, the conductor plate 20B includes a body plate 21B and a mounting plate 22B. The body plate 21B is spaced apart from, and overlaps with, the body plate 21A in the thickness directions of the body plates 21A and 21B. That is, the body plates 21A and 21B face each other in an orientation in which the thickness directions of the body plates 21A and 21B substantially coincide with each other. The body plate 21B extends along the longitudinal direction of the body plate 21A. That is, the longitudinal direction of the body plate 21B also intersects the wall 70. The shape and the size of the body plate 21B are the same as those of the body plate 21A, and, therefore, redundant descriptions thereof are omitted.

The mounting plate 22B extends along the wall 70 from an end of the body plate 21B that is located on the wall 70 side. In the example shown in FIG. 1, the mounting plate 22B extends along the wall 70 from the aforementioned end of the body plate 21B toward the side opposite to the conductor plate 20A. That is, the mounting plates 22A and 22B extend in directions opposite to each other from the ends of the body plates 21A and 21B, respectively. The shape and the size of the mounting plate 22B are the same as those of the mounting plate 22A, and, therefore, redundant descriptions thereof are omitted.

A through hole 23B is formed in the mounting plate 22B. The through hole 23B extends through the mounting plate 22B along the through direction. The shape and the size of the through hole 23B are the same as those of the through hole 13B, and, therefore, redundant descriptions thereof are omitted.

A through hole 71B is formed in the wall 70. The through hole 71B extends through the wall 70 along the through direction perpendicular to the wall 70. The through hole 71B is formed in a position at which it faces the through holes 13B and 23B in the through direction. That is, the through holes 13B, 71B, and 23B are disposed in that order from the first space R1 side toward the second space R2 side. The through hole 71B has, for example, a circular shape as viewed in the through direction. The diameter of the through hole 71B can be set to a value such that the fastening member 40B can penetrate the through hole 71B and that the wall 70 is interposed between the mounting plates 12B and 22B.

The fastening member 40B is electrically conductive, penetrates the wall 70 while being conductively connected to the conductor plates 10B and 20B, and fastens the conductor plates 10B and 20B to the wall 70. The material of the fastening member 40B may be selected as appropriate, and a metal (e.g., iron) can be used, for example. The fastening member 40B is the same as the fastening member 40A, and, therefore, redundant descriptions thereof are omitted.

As described above, since the conductor plates 10B and 20B are electrically connected to each other via the fastening member 40B, a set of the conductor plates 10B and 20B and the fastening member 40B can also function as wiring. For example, the conductor plates 10A and 10B may be connected to an electricity storage device (e.g., a battery or a capacitor) via a wire harness. For example, the conductor plate 10A is connected to the high potential-side output end of the electricity storage device, and the conductor plate 10B may be connected to the low potential-side output end of the electricity storage device. This allows the wiring module 100 to function as a power line. For example, the conductor plates 10A, 10B, 20A, and 20B may be connected as needed to an electric device (e.g., an electric device such as an electronic control unit (ECU) or an electric motor) via a wire harness. Thus, the power from the electricity storage device is supplied to the electric device via the wiring module 100.

The wiring module 100 connects wire harnesses to each other as described above, and thus can also function as a connection module for connecting wire harnesses.

Moreover, with the wiring module 100, the pair of conductor plates 10A and 20A do not penetrate the wall 70 (through hole 71A), and the fastening member 40A penetrates the wall 70. Accordingly, the shape of the through hole 71A as viewed along the through direction can be set independent of the cross section of the conductor plates 10A and 20A. The shape of the through hole 71A may be set according to the cross section of the penetration portion (e.g., the columnar portion of the bolt 41A) of the fastening member 40A. Similarly, the pair of conductor plates 10B and 20B do not penetrate the wall 70 (through hole 71B), and the fastening member 40B penetrates the wall 70. Accordingly, the shape of the through hole 71B as viewed along the through direction can be set independent of the cross section of the conductor plates 10B and 20B. The shape of the through hole 71B may be set according to the cross section of the penetration portion (e.g., the columnar portion of the bolt) of the fastening member 40B.

Figure 3:
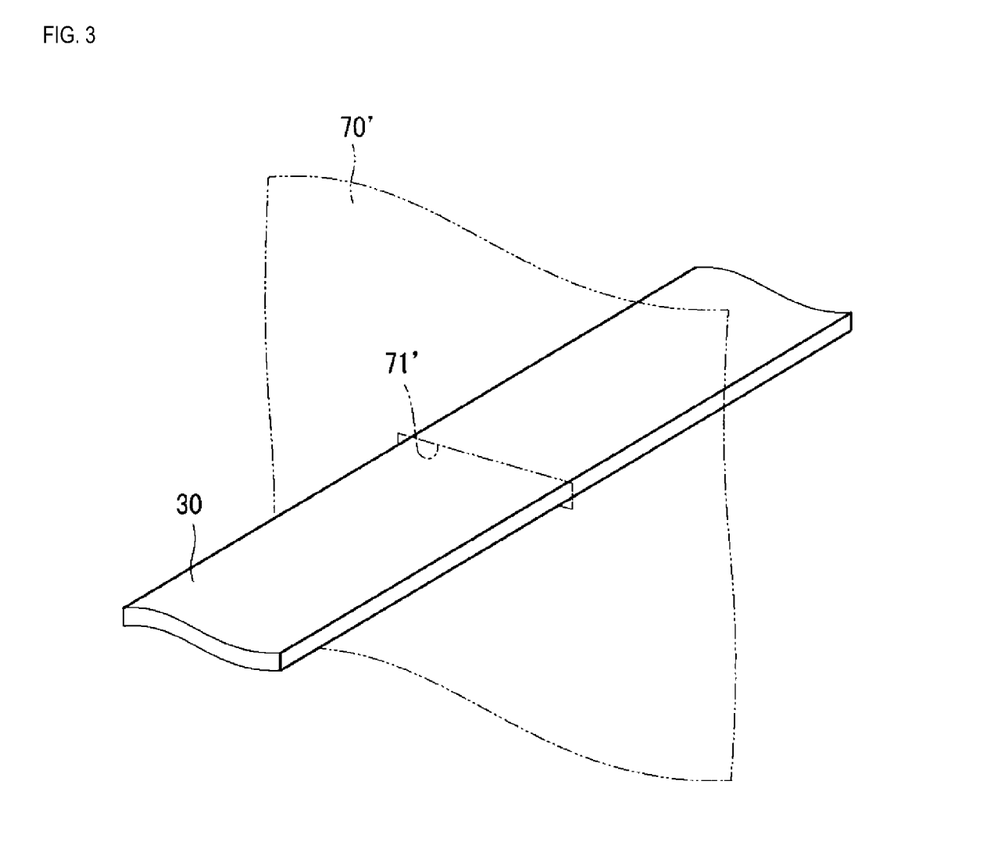
FIG. 3 is a perspective view schematically showing an exemplary configuration of a wiring module according to a comparative example.

FIG. 3 is a perspective view schematically showing an exemplary configuration of a conductor plate 30 according to a comparative example. The conductor plate 30 is a plate-shaped member that is long in the longitudinal direction, and has a flat shape (e.g., a rectangular shape) on a cross section perpendicular to the longitudinal direction thereof.

A through hole 71' that allows penetration of the conductor plate 30 along the longitudinal direction thereof is formed in a wall 70' provided in a vehicle. The through hole 71' has a size that is sufficiently large enough to allow penetration of the conductor plate 30 in the longitudinal direction. Accordingly, the shape and the size of the through hole 71' are dependent on the shape of the cross section of the conductor plate 30. In the example shown in FIG. 3, the through hole 71' as viewed in the through direction has a rectangular shape that is wide in the width direction of the conductor plate 30.

On the other hand, according to the present embodiment, the shape of the fastening member 40A can be set according to the cross section of the penetration portion of the fastening member 40A, independent of the cross section of the conductor plates 10A and 20A, as described above. For example, the size of the cross section of the penetration portion of the fastening member 40A may be set to be smaller than the size of the cross section of any of the body plates 11A and 21A. This makes it possible to set the size of the through hole 71A to be smaller than that of the through hole 71'. By setting the size of the through hole 71A to be small in this way, it is possible, for example, to inhibit the road noise and vibration caused by the friction or collision between a tire of the vehicle and the road surface from being transmitted into the vehicle compartment.

In the example shown in FIG. 3, the through hole 71' is long in the width direction of the conductor plate 30. Accordingly, for example, when vibration is generated that causes the through hole 71' (or the conductor plate 30) to rotate relative to the center of the through hole 71', the conductor plate 30 tends to collide with the wall 70' at both ends in the width direction thereof.

Therefore, the oblateness of the cross section of the penetration portion of the fastening member 40A may be set to be smaller than the oblateness of the cross section of any of the body plates 11A and 21A. The oblateness as used herein is the ratio of the size of the body plates 11A and 21A along the width direction relative to the size of the body plates 11A and 21A along the thickness direction. Since the width is larger than the thickness for the body plates 11A and 21A, the oblateness is greater than 1. On the other hand, when the cross section of the penetration portion of the fastening member 40A has a circular shape, the oblateness of the penetration portion of the fastening member 40A is approximately 1. In this case, if the sizes of the through hole 71' and the through hole 71A are comparable, the size of the through hole 71A in the width direction is smaller than that of the through hole 71'. Accordingly, it is possible to reduce the occurrence of collision between the penetration portion of the fastening member 40A and the wall 70 as compared with the comparative example.

The fastening member 40A can fasten the conductor plates 10A and 20A to the wall 70. Therefore, it is possible to reduce the noise generated between the wiring module 100 and the wall 70 due to vibration.

Note that the fastening member 40A is not necessarily limited to being a nut and a bolt. In short, it is possible to use any fastening member capable of conductively connecting the conductor plates 10A and 20A and fastening these components to the wall 70. For example, the fastening member 40A may be a rivet made of a conductive material. The same applies to the fastening member 40B.

The conductor plates 10A, 20A, 10B, and 20B may be covered with an insulator as needed, except for a portion thereof that is to be electrically connected to another member. This can ensure the insulation between the wiring module 100 and the outside.

Integrated Object

The body plate 11A and the mounting plate 12A may constitute an integrated object that is formed continuously using the same material. Such a conductor plate 10A can be produced, for example, in the following manner. That is, the conductor plate 10A can be produced by forming a through hole in a distal end portion of a conductive plate that is long in the longitudinal direction, and bending the distal end portion, for example, along a line extending along the width direction as a fold. When the body plate 11A and the mounting plate 12A constitute an integrated object, the conductor plate 10A can be easily handled when being fastened to the wall 70. The same applies to the conductor plates 10B, 20A, and 20B.

Second Embodiment

Figure 4:
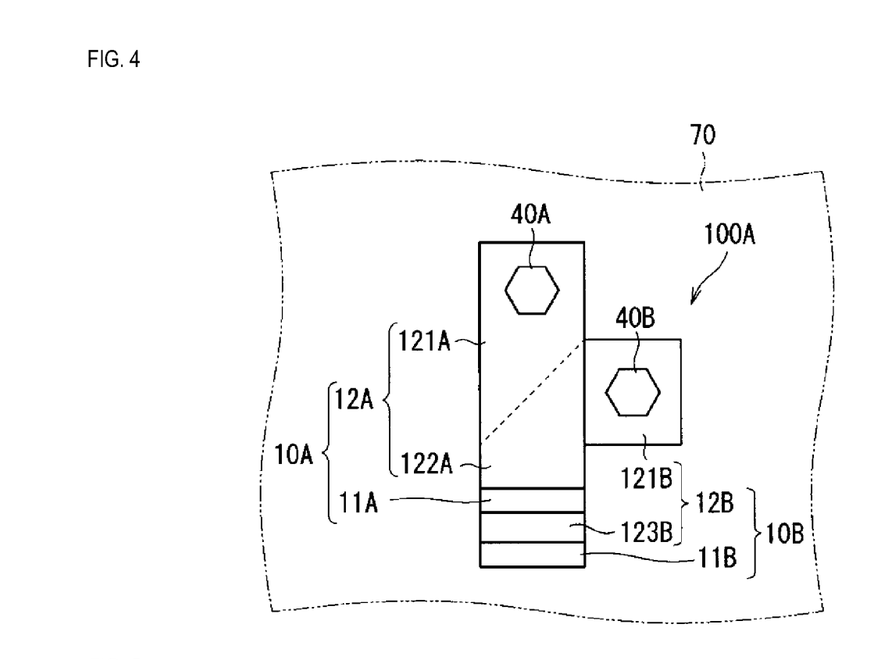
FIG. 4 is a diagram schematically showing an exemplary configuration of a wiring module.
Figure 5:
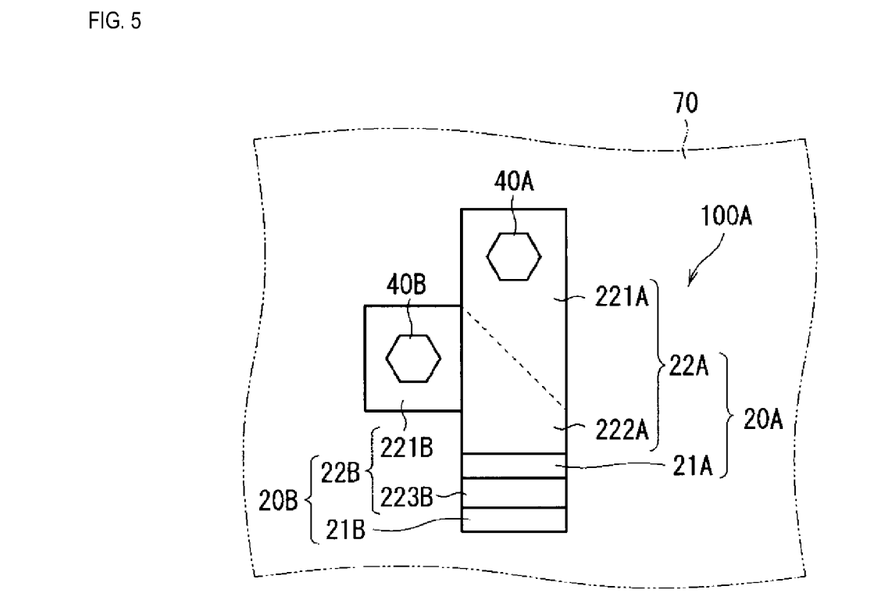
FIG. 5 is a diagram schematically showing an exemplary configuration of the wiring module.

FIGS. 4 and 5 are diagrams schematically showing an exemplary configuration of a wiring module 100A. FIG. 4 shows an exemplary configuration of the wiring module 100A, as viewed along the through direction from the first space R1 side, and FIG. 5 shows the exemplary configuration of the wiring module 100A, as viewed along the through direction from the second space R2 side.

Figure 6:
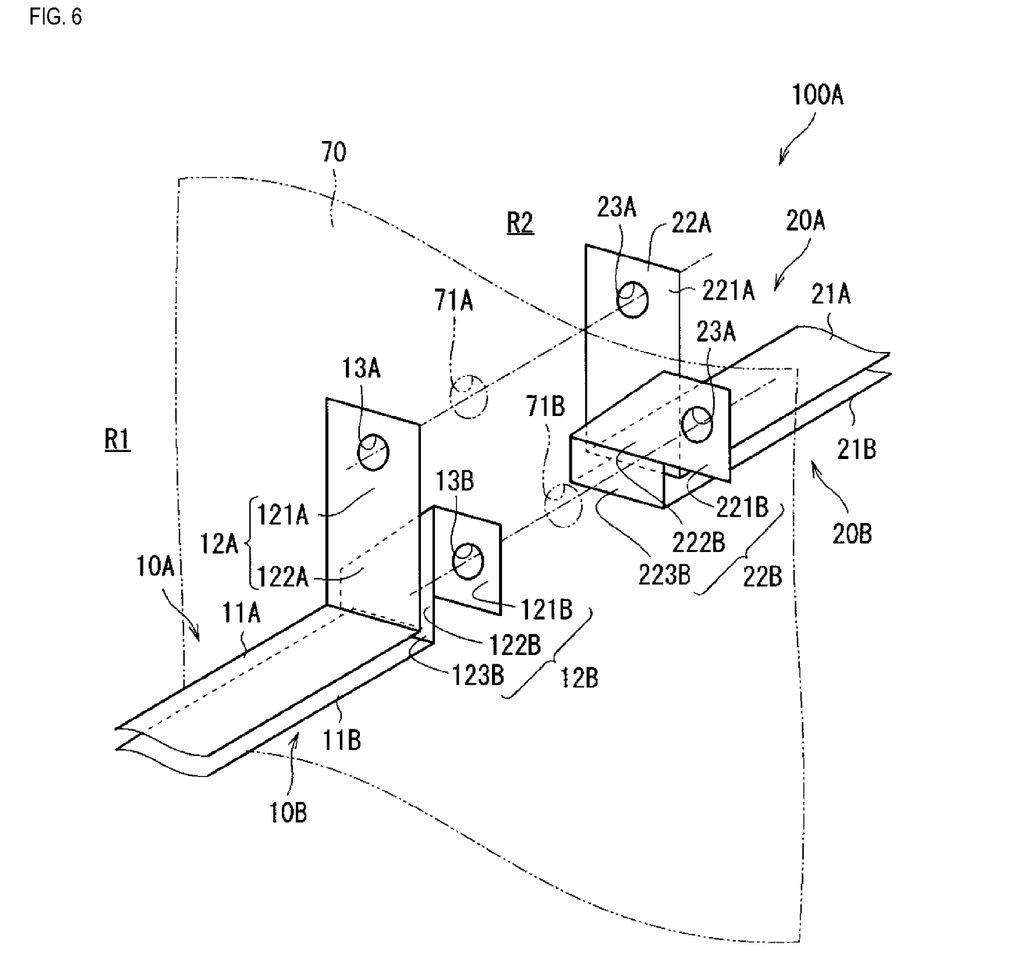
FIG. 6 is an exploded perspective view schematically showing an exemplary configuration of the wiring module.

The wiring module 100A has a configuration similar to that of the wiring module 100, but is different from the wiring module 100 with respect to the mounting plates 12B and 22B. FIG. 6 is an exploded perspective view schematically showing an exemplary configuration of the conductor plates 10A, 10B, 20A, and 20B belonging to the wiring module 100A. In the example shown in FIG. 6, the illustrations of the thicknesses of the conductor plates 10A, 10B, 20A, and 20B are omitted to facilitate viewing.

The mounting plate 12B extends on the same side as the mounting plate 12A from an end of the body plate 11B that is located on the wall 70 side. However, the mounting plates 12A and 12B are spaced apart from each other. That is, the mounting plates 12A and 12B are insulated from each other. In the example shown in FIG. 6, the mounting plates 12A and 12B are spaced apart from each other and extend upward in the plane of paper from the ends of the body plates 11A and 11B, respectively. The mounting plate 12B is located between the mounting plate 12A and the wall 70.

The mounting plate 12A includes a portion 121A that does not overlap with the mounting plate 12B in the through direction, and the mounting plate 12B includes a portion 121B that does not overlap with the mounting plate 12A in the through direction. As will be described below, the portions 121A and 121B are portions to which the fastening members 40A and 40B are respectively mounted, and through holes 13A and 13B are formed in the portions 121A and 121B, respectively. Accordingly, the portions 121A and 121B are hereinafter also referred to as "fastening target portions 121A and 121B".

In the example shown in FIGS. 4 and 6, the mounting plate 12A has, for example, a substantially rectangular shape as viewed in the through direction. A portion of the mounting plate 12A that is located on the distal end side (the side distant from the body plate 11A) is the fastening target portion 121A that does not overlap with the mounting plate 12B, for example. The overlapping portion 122A of the mounting plate 12A that is located on the proximal end side (the side close to the body plate 11A) is spaced apart from, and overlaps with, the mounting plate 12B in the through direction. A predetermined insulator (e.g., a resin) may be interposed between the mounting plates 12A and 12B.

In the example shown in FIGS. 4 and 6, the mounting plate 12B has a substantially L-shape as viewed in the through direction. For example, the mounting plate 12B includes the fastening target portion 121B, an overlapping portion 122B, and a portion 123B. The portion 123B is provided at an end of the body plate 11B, and is located between the body plates 11A and 11B in the through direction. Accordingly, the portion 123B does not overlap with the conductor plate 10A in the through direction. The overlapping portion 122B extends continuously with the portion 123B on the side opposite to the body plate 11B relative to the portion 123B. The overlapping portion 122B is spaced apart from, and overlaps with, the overlapping portion 122A of the mounting plate 12A in the through direction.

The fastening target portion 121B bulges outward from a side portion of the overlapping portion 122B as viewed in the through direction for example. For example, the fastening target portion 121B protrudes to the right in the plane of paper in FIG. 4 from the side portion of the overlapping portion 122B. The fastening target portion 121B does not overlap with the mounting plate 12A in the through direction.

As shown in FIGS. 5 and 6, the conductor plates 20A and 20B have configurations similar to those of the conductor plates 10A and 10B, respectively. Specifically, the mounting plates 22A and 22B extend in the same direction respectively from the ends of the body plates 21A and 21B that are located on the wall 70 side. The mounting plate 22A includes a fastening target portion 221A that does not overlap with the mounting plate 22B in the through direction, and the mounting plate 22B includes a fastening target portion 221B that does not overlap with the mounting plate 22A in the through direction.

As a specific example, the mounting plate 22A includes the fastening target portion 221A and an overlapping portion 222A, and the mounting plate 22B includes the fastening target portion 221B, an overlapping portion 222B, and a portion 223B. The fastening target portions 221A and 221B, the overlapping portions 222A and 222B, and the portion 223B are the same as the fastening target portions 121A and 121B, the overlapping portions 122A and 122B, and the portion 123B, respectively, and, therefore, redundant descriptions thereof are omitted. Note that a predetermined insulator (e.g., a resin) may also be interposed between the overlapping portions 222A and 222B.

The fastening target portion 221A faces the fastening target portion 121A via the wall 70, and the through holes 13A, 71A, and 23A that are formed in the fastening target portion 121A, the wall 70, and the fastening target portion 221A, respectively, face each other in the through direction. Similarly, the fastening target portion 221B faces the fastening target portion 121B via the wall 70, and the through holes 13B, 71B, and 23B that are formed in the fastening target portion 121B, the wall 70, and the fastening target portion 221B, respectively, face each other in the through direction.

The fastening member 40A penetrates the through holes 13A, 71A, and 23A to conductively connect the fastening target portions 121A and 221A, and fastens the fastening target portions 121A and 221A to the wall 70. The fastening member 40B penetrates the through holes 13B, 71B, and 23B to conductively connect the fastening target portions 121B and 221B, and fastens the fastening target portions 121B and 221B to the wall 70.

As described above, with the wiring module 100A, the mounting plates 12A and 12B extend on the same side relative to the body plate 11A. Hence, the fastening target portions 121A and 121B are provided on the same side relative to the body plate 11A. Similarly, the fastening target portions 221A and 221B are provided on the same side relative to the body plate 21A. Accordingly, the operator can mount the fastening members 40A and 40B on the same side relative to the body plates 11A and 21A. This allows the operator to easily perform the fastening operation.

For example, when the wall 70 extends from the floor surface of a vehicle and the body plates 11B and 21B are disposed on the floor surface of the vehicle, the conductor plates 10B and 20B can be disposed along the floor surface and the wall 70 if the mounting plates 12B and 22B are provided on the same side relative to the body plate 11B.

Folding-Back

Figure 7:
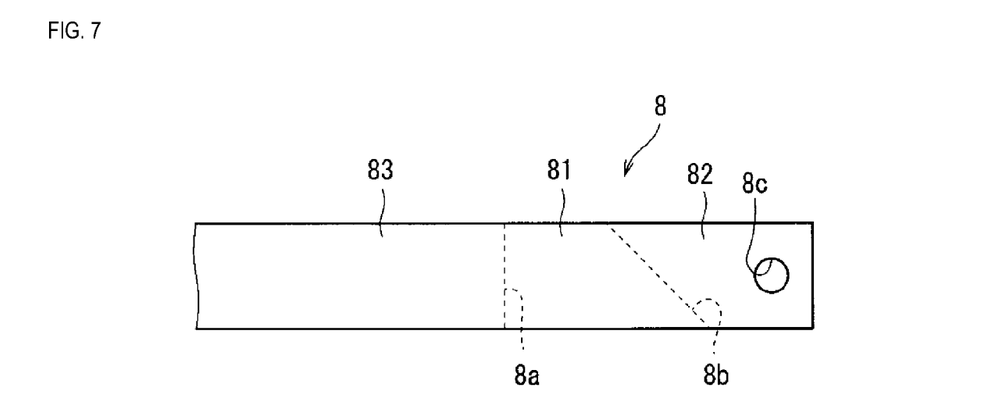
FIG. 7 is a diagram schematically showing an exemplary configuration of a conductor plate before being bent.

The shape of the mounting plate 12B may be formed by bending a predetermined conductor plate. FIG. 7 is a plan view schematically showing an exemplary configuration of a predetermined conductor plate 8 before being bent. For example, the conductor plate 8 has an elongated shape (e.g., a rectangular shape) that is long in the longitudinal direction, and has a flat shape (e.g., a rectangular shape) on a cross section perpendicular to the longitudinal direction thereof. For example, a through hole 8c is formed in a distal end portion of the conductor plate 8. The through hole 8c extends through the conductor plate 8 in the thickness direction thereof.

The conductor plate 8 is bent along two folds 8a and 8b. The fold 8b is located on the distal end side (the through hole 8c side) of the conductor plate 8 relative to the fold 8a. In the following, a portion of the conductor plate 8 that is sandwiched between the folds 8a and 8b is referred to as a "first portion 81", a portion of the conductor plate 8 that is located on the through hole 8c side relative to the fold 8b as a "second portion 82", and a portion of the conductor plate 8 that is located on the side opposite to the through hole 8c relative to the fold 8a as a "third portion 83".

The fold 8a extends along the width direction of the conductor plate 8, for example. The conductor plate 8 is bent along the fold 8a. For example, the conductor plate 8 is bent such that the first portion 81 and the third portion 83 are substantially orthogonal to each other. The third portion 83 functions as the body plate 11B.

The fold 8b extends inclined relative to the fold 8a. For example, the fold 8b is inclined at 45 degrees relative to the fold 8a. The conductor plate 8 is folded back along the fold 8b. That is, the conductor plate 8 is folded back such that portions that are adjacent to each other with the fold 8b as a boundary overlap with each other. In other words, a portion of the first portion 81 that is located on the fold 8b side and a portion of the second portion 82 that is located on the fold 8b overlap with each other.

In the folded-back state, the distal end portion of the second portion 82 does not overlap with the first portion 81. That is, the distal end portion of the second portion 82 extends outward from a side portion of the first portion 81. The through hole 8c is located at this portion of the second portion 82 that is located on the distal end side. Accordingly, the through hole 8c also does not overlap with the first portion 81. The portion of the second portion 82 that is located on the distal end side corresponds to the fastening target portion 121B, and the through hole 8c corresponds to the through hole 13B. The portion of the second portion 82 that is located on the fold 8b side and the first portion 81 correspond to the overlapping portion 122B and the portion 123b.

As described above, the conductor plate 8 can be produced by bending the conductor plate 10B. This makes it possible to easily produce the conductor plate 10B. The same applies to the conductor plate 20B.

Folding-Back Direction

When the conductor plate 10B is produced in the above-described manner, it is desirable that the conductor plate 8 is folded back such that the second portion 82 is located on the wall 70 side relative to the first portion 81.

Figure 8:
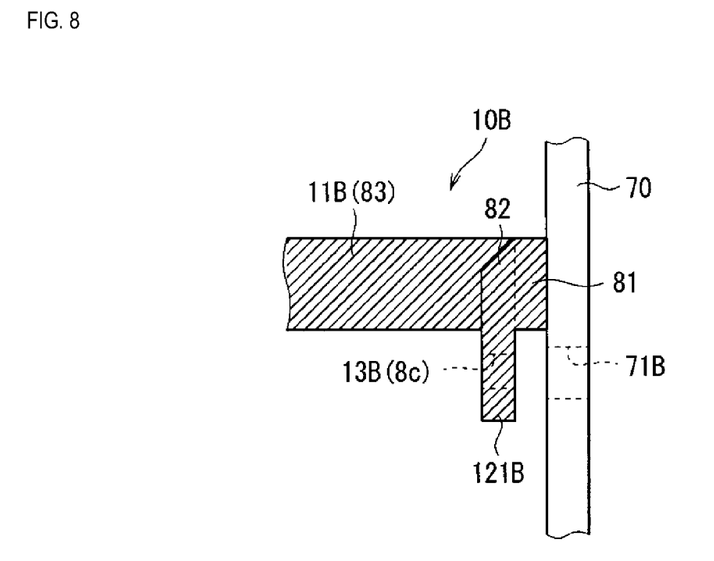
FIG. 8 is a diagram schematically showing an exemplary configuration of a conductor plate.

As a comparative example, a case will be considered where the first portion 81 is located on the wall 70 side relative to the second portion 82. FIG. 8 is a diagram schematically showing an exemplary configuration of the conductor plate 10B. FIG. 10 schematically shows the exemplary configuration of the conductor plate 10B, as viewed along the thickness direction of the body plate 11B. In the example shown in FIG. 8, the first portion 81 is located on the wall 70 side relative to the second portion 82. To describe with reference to FIG. 7, the conductor plate 10B is bent by valley folding along both the folds 8a and 8b.

Accordingly, a gap corresponding to the thickness of the first portion 81 may be created between the fastening target portion 121B on the distal end side of the second portion 82 and the wall 70. Therefore, it is difficult to perform fastening using the fastening member 40B. Alternatively, when the fastening target portion 121B is fastened using the fastening member 40B, unwanted residual stress may be generated in the conductor plate 10B (especially, the second portion 82).

Figure 9:
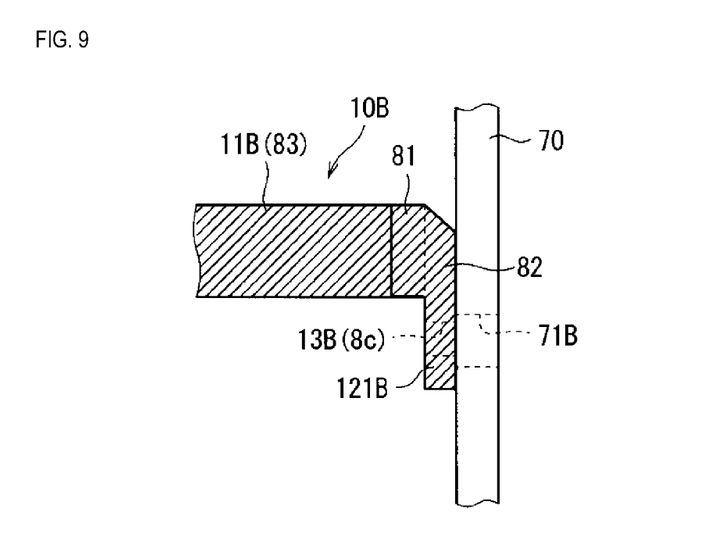
FIG. 9 is a diagram schematically showing an exemplary configuration of a conductor plate.

On the other hand, when the second portion 82 is located on the wall 70 side relative to the first portion 81 as described above, the above-described gap will not be created. FIG. 9 is a diagram schematically showing an exemplary configuration of the conductor plate 10B. FIG. 9 schematically shows the exemplary configuration of the conductor plate 10B, as viewed along the thickness direction of the body plate 11B. To describe with reference to FIG. 7, the conductor plate 10B is bent along the fold 8a by valley folding, and is bent along the fold 8b by mountain folding. In the conductor plate 10B, the second portion 82 is located on the wall 70 side relative to the first portion 81, and, therefore, a gap corresponding to the thickness of the first portion 81 will not be created between the fastening target portion 121B on the distal end side of the second portion 82 and the wall 70. Accordingly, the fastening target portion 121B can be easily fastened to the wall 70 using the fastening member 40B.

Mounting Plate

Figure 10:
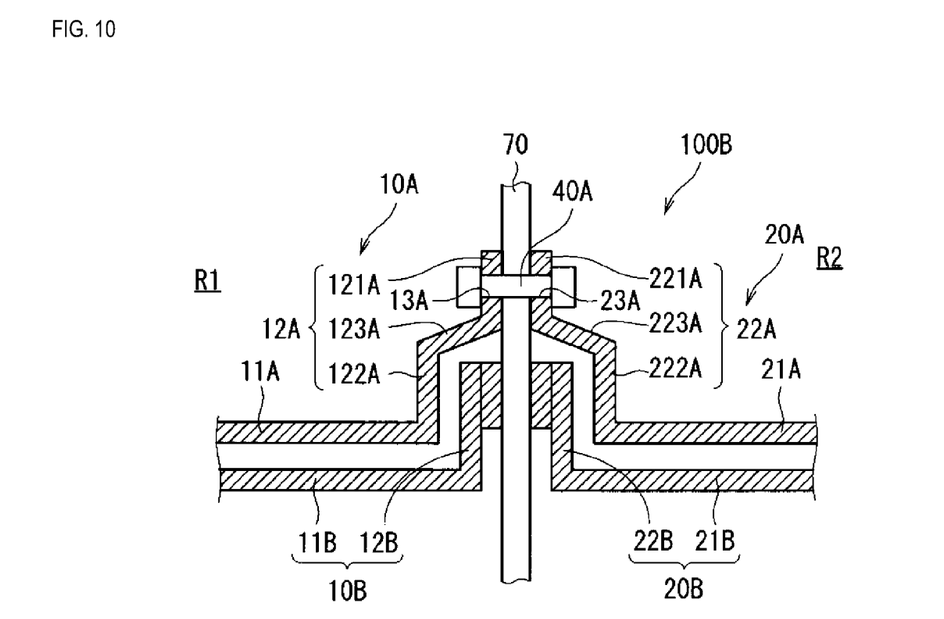
FIG. 10 is a cross-sectional view schematically showing an exemplary configuration of a wiring module.

In the example shown in FIG. 6, the mounting plate 12B is located between the mounting plate 12A and the wall 70. Accordingly, a gap corresponding to at least the thickness of the mounting plate 12B and the insulation between the mounting plates 12A and 12B may be created between the fastening target portion 121A of the mounting plate 12A and the wall 70. Therefore, the mounting plate 12A may have a shape as described in the following. FIG. 10 is a diagram schematically showing an exemplary configuration of a wiring module 100B. The wiring module 100B has a configuration similar to that of the wiring module 100A, but is different from the wiring module 100A with respect to the shapes of the mounting plates 12A and 22A.

The mounting plate 12A of the conductor plate 10A includes the fastening target portion 121A, the overlapping portion 122A, and a coupling portion 123A. The coupling portion 123A is a portion that links the fastening target portion 121A and the overlapping portion 122A together. The coupling portion 123A extends approaching the wall 70 toward the fastening target portion 121A. Accordingly, the fastening target portion 121A can be disposed closer to the wall 70 than the overlapping portion 122A is. In the example shown in FIG. 10, the fastening target portion 121A is in contact with the wall 70. This allows the fastening member 40A to easily fasten the fastening target portion 121A. Such a conductor plate 10A can also be produced by bending a predetermined conductor plate.

Modifications

Figure 11:
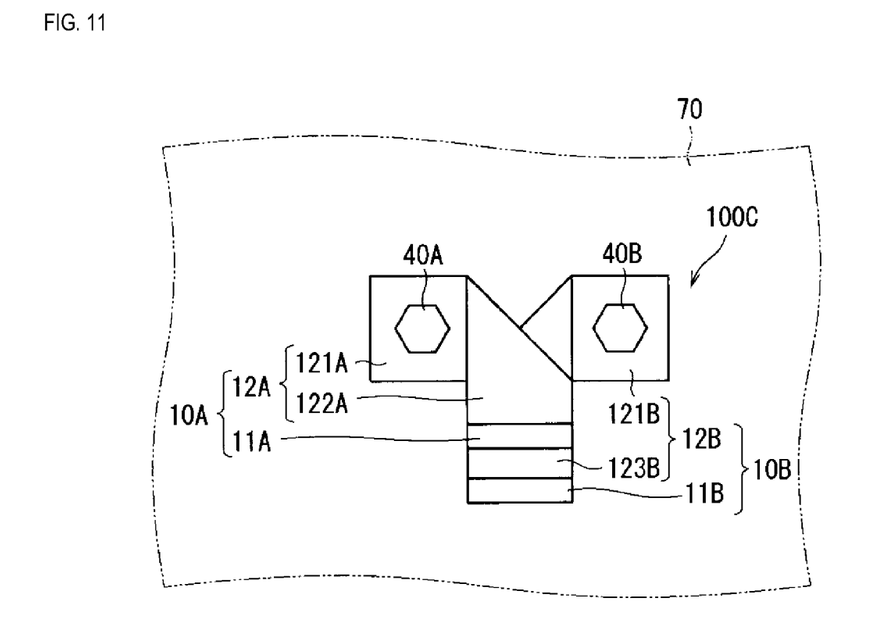
FIG. 11 is a diagram schematically showing an exemplary configuration of a wiring module.

FIG. 11 is a diagram schematically showing an exemplary configuration of a wiring module 100C. The wiring module 100C has a configuration similar to that of the wiring module 100A, but is different from the wiring module 100A with respect to the mounting plate 12A of the conductor plate 10A. As shown in FIG. 11, the mounting plate 12A also has a substantially L-shape. For example, the fastening target portion 121A bulges to the side opposite to the fastening target portion 121B from a side portion of the overlapping portion 122A.

The conductor plate 20A, which is electrically connected to the conductor plate 10A via the fastening member 40A, is the same as the conductor plate 10A. That is, the mounting plate 22A also has a substantially L-shape as the mounting plate 12A. Also, the fastening target portion 121A of the mounting plate 12A faces the fastening target portion 221A of the mounting plate 22A via the wall 70.

Each of the mounting plates 12A and 22A may be produced by folding back a predetermined conductor plate. In this respect as well, the mounting plate 22A is the same as the conductor plate 10B, and, therefore, redundant description thereof is are omitted.

The positions of the fastening target portions 121A, 121B, 221A, and 221B can be adjusted by appropriately setting the positions and the extension directions of the folding-back folds on the mounting plates 12A, 12B, 22A, and 22B.

Note that the configurations described in the embodiments and the modifications may be combined as appropriate as long as there are no mutual inconsistencies.

Although the present wiring module has been described above in detail, the foregoing description is illustrative in all aspects and the present wiring module is not limited thereto. It will be appreciated that numerous modifications not illustrated herein can be made without departing from the scope of the present wiring module.

The invention claimed is:

1. A wiring module configured to penetrate a wall provided in a vehicle, comprising:
    a pair of first conductor plates that are disposed opposite to each other via the wall; and
    a conductive first fastening member configured to penetrate the wall while being conductively connected to the pair of first conductor plates, and to fasten the pair of first conductor plates to the wall;
wherein one of the first conductor plates includes:
a first body plate extending in a direction away from the wall; and
a first mounting plate extending along the wall from an end of the first body plate that is located on the wall side, and
the first fastening member is configured to fasten the first mounting plate to the wall.

2. The wiring module according to claim 1, further comprising:
a pair of second conductor plates disposed opposite to each other via the wall; and
a conductive second fastening member configured to penetrate the wall while being conductively connected to the pair of second conductor plates, and to fasten the pair of second conductor plates to the wall,
wherein one of the pair of second conductor plates includes:
a second body plate extending spaced apart from, and overlapping with, the first body plate in a thickness direction of the first body plate; and
a second mounting plate that is spaced apart from the first mounting plate and extends on the same side as the first mounting plate from an end of the second body plate that is located on the wall side,
the first mounting plate includes a first fastening target portion that does not overlap with the second mounting plate,
the second mounting plate includes a second fastening target portion that does not overlap with the first mounting plate,
the first fastening member is configured to fasten the first fastening target portion to the wall, and
the second fastening member is configured to fasten the second fastening target portion to the wall.

3. The wiring module according to claim 2,
wherein the second mounting plate includes:
a first portion that is spaced apart from the first mounting plate and overlaps with the first mounting plate in a direction perpendicular to the wall; and
a second portion that is folded back from the first portion so as to be located on the wall side relative to the first portion,
a distal end portion of the second portion extends outward from a side portion of the first portion, and
the second fastening target portion is the distal end portion.

4. The wiring module according to claim 2, wherein the first mounting plate further includes:
an overlapping portion that is located opposite to the wall relative to the second mounting plate, and overlaps with the second mounting plate in a direction perpendicular to the wall; and
a coupling portion configured to couple the overlapping portion and the first fastening target portion to each other, and
the coupling portion extends approaching the wall toward the first fastening target portion, and the first fastening target portion is located closer to the wall than the overlapping portion is.

5. The wiring module according to claim 3, wherein the first mounting plate further includes:
an overlapping portion that is located opposite to the wall relative to the second mounting plate, and overlaps with the second mounting plate in a direction perpendicular to the wall; and
a coupling portion configured to couple the overlapping portion and the first fastening target portion to each other, and
the coupling portion extends approaching the wall toward the first fastening target portion, and the first fastening target portion is located closer to the wall than the overlapping portion is.

* * * * *